(12) United States Patent
Huang

(10) Patent No.: US 7,792,914 B2
(45) Date of Patent: Sep. 7, 2010

(54) SERVER WITH NETWORK-BASED REMOTE ACCESS AND SERVER MANAGEMENT FUNCTIONS USING REDUCED NUMBER OF NETWORK CONNECTIONS

(75) Inventor: Shih-Yuan Huang, Keelung (TW)

(73) Assignee: ATEN International Co., Ltd. (TW)

( * ) Notice: Subject to any disclaimer, the term of this patent is extended or adjusted under 35 U.S.C. 154(b) by 244 days.

(21) Appl. No.: 12/014,016

(22) Filed: Jan. 14, 2008

(65) Prior Publication Data

US 2009/0182799 A1   Jul. 16, 2009

(51) Int. Cl.
G06F 15/16  (2006.01)
(52) U.S. Cl. ................................................ 709/208
(58) Field of Classification Search .............. 709/208
See application file for complete search history.

(56) References Cited

U.S. PATENT DOCUMENTS

| | | | | |
|---|---|---|---|---|
| 5,878,248 | A * | 3/1999 | Tehranian et al. | 345/502 |
| 6,347,345 | B1 * | 2/2002 | Cheon | 710/20 |
| 6,636,902 | B2 * | 10/2003 | Ihara | 710/5 |
| 7,474,431 | B2 * | 1/2009 | Yamano et al. | 358/1.15 |
| 2002/0087724 | A1 * | 7/2002 | Datta et al. | 709/241 |
| 2003/0056012 | A1 * | 3/2003 | Modeste et al. | 709/249 |
| 2008/0080492 | A1 * | 4/2008 | Pyeon et al. | 370/389 |
| 2008/0144645 | A1 * | 6/2008 | Russell et al. | 370/412 |
| 2008/0165795 | A1 * | 7/2008 | Baruch | 370/421 |

OTHER PUBLICATIONS

PCI/PCI-X Family of Gigabit Ethernet Controllers Software Developer's Manua, Intel Corp., 2007.
82541 Family of Gigabit Ethernet Controllers Datasheet, Intel Corp., 2007.
Intel® 82571 & 82572 Gigabit Ethernet Controller Datasheet, Intel Corp., Dec. 2006.
Managing and Monitoring High-Performance Computing Clusters with IPMI, Yung-Chin Fang, Garima Kochhar, and Randy Deroeck, Oct. 2004.

* cited by examiner

*Primary Examiner*—Wing F Chan
*Assistant Examiner*—Tesfay Yohannes
(74) *Attorney, Agent, or Firm*—Chen Yoshimura LLP

(57) ABSTRACT

A server with network-based remote access (iKVM) functions and server management such as IPMI (Intelligent Platform Management Interface) functions include a system section for performing various server functions, an iKVM controller for controlling remote access, and an BMC for controlling the server management function. The iKVM controller is provided with a management channel feature so that the BMC can share a network interface controller/circuit/chip (NIC) with the iKVM. The BMC is connected to the iKVM controller, and the iKVM controller is connected to an NIC for the iKVM. The NIC for the iKVM is either directly connected to the network or connected to a NIC for the system section which is in turn connected to the network. In the latter case, the NIC for the system has a management channel where the packets from the iKVM are transmitted. As a result, only one network connector is required for the server.

14 Claims, 3 Drawing Sheets

SERVER WITH NETWORK-BASED REMOTE ACCESS AND SERVER MANAGEMENT FUNCTIONS USING REDUCED NUMBER OF NETWORK CONNECTIONS

BACKGROUND OF THE INVENTION

1. Field of the Invention

This invention relates to a server with network-based remote access and server management functions, and in particular, it relates to such a server requiring a reduced number of network connections.

2. Description of the Related Art

A KVM (keyboard video mouse) switch is a device that allows one or more user consoles to selectively communicate with one or more computers connected to the KVM switch. In a conventional KVM switch configuration, one or more consoles (each including a keyboard and/or mouse and a display device) are connected to the KVM switch by cables, and a plurality of computers (e.g. servers or PCs) are connected to the KVM switch by cables. A network-enabled KVM switch (sometimes referred to as a network-based or IP-based KVM switch or an iKVM switch, and the technology is sometimes referred to KVM over IP) uses a network protocol (e.g. TCP/IP) as its communication protocol, and can be accessed from any computer on a network (such as a WAN, LAN, the Internet, Intranet, Ethernet, wireless network, etc.) A remote operator can log in to an iKVM switch from anywhere on the network via a browser, and can exchange keyboard, video and mouse signals with any one of the computers connected to the iKVM switch. An iKVM switch has a controller, referred to as an iKVM controller, which is connected to a controller/circuit/chip (NIC) for handling packets containing keyboard and mouse signals received from a remote console on a network, and transmits packets containing video signals and other signals to the network via the NIC.

More generally, a server (including a KVM switch) with network-based remote access functions allows a remote console located on a network to communicate with and control the server using a network protocol (e.g. TCP/IP) as its communication protocol. Once logged in to the server, the remote console can exchange keyboard, video and mouse signals with the server and control the server as if the remote console is directly connected to the server. Such network-based remote server access is generally referred to in this disclosure as an iKVM or KVM over IP function of the server.

IPMI (Intelligent Platform Management Interface) is a specification that defines a set of common interfaces to computer hardware and firmware which system administrators can use to monitor system health and manage the system. The IPMI technology allows the monitoring of server hardware health related factors including CPU temperature, voltage, fan speed, etc. IPMI operates independently of the operating system, and runs on a dedicated controller called the BMC (Baseboard Management Controller) and other satellite controllers. The IPMI system communicates with a remote management console using messages transferred between the BMC and the remote management console over a network such as an Ethernet LAN or other network. The IPMI messages are encapsulated into packets at the LAN controller and sent out on the network. Widely used on servers and other devices, IPMI is quickly becoming a computer industry standard for troubleshooting and failure prevention.

FIGS. 1-3 illustrate configurations of a server with iKVM (network-based remote access) and server management such as IPMI (Intelligent Platform Management Interface) functions. From the standpoint of network connection, as schematically illustrated in FIG. 1, a server 100 with iKVM and server management (such as IPMI) functions can be considered as having three sections each requiring a connection to the network: the system section, the iKVM section, and the IPMI section. The iKVM section includes an iKVM controller 120 that handles the functions related to network-based remote access to the server; the IPMI section includes a BMC (Baseboard Management Controller) 130 that handles Server management functions; the system section 110 includes the portion of the server that performs various data processing functions of the server, such as a CPU, memory, etc. FIG. 1 shows a conventional configuration of a server with iKVM and Server management functions, where the system section 110 is connected to the network by a network interface controller/circuit/chip (NIC) 112 for the system, the iKVM controller 120 is connected to the network by a NIC 122 for the iKVM, and the IPMI section (the BMC) 130 is connected to the network by a NIC 132 for the BMC. Each NIC 112, 122, 132 is connected to a network connector, such as an RJ45 connector, for receiving a network communication cable. Thus, three network connectors and three network communication cables are be required for the server using this configuration. (For brevity, in the present disclosure and claims, the term "network interface controller" is used to refer to what is commonly called "network interface controller", "network interface circuit", or "network interface controller chip", commonly abbreviated as NIC.)

Certain commercially available NICs provide a management channel (also referred to as a sideband) in addition to a main channel, and use the management channel to transmit management data. Using such a NIC allows the BMC to share the network connection of the system. In a server 200 adopting such a configuration, schematically illustrated in FIG. 2, the NIC 212 for the system has a management channel capable of handling the IPMI data. The NIC 232 for the BMC is connected to the management port of the NIC 212 for the system via a sideband connection 214, rather than connected to the network directly. The NIC 212 for the system detects incoming packets from the network; if the incoming packets are management packets (such as IPMI format packets), they are delivered to the NIC 232 which transmits them to the BMC 230. If the incoming packets are not management packets, they are sent to the system section 210. The BMC uses the NIC 212 for the system to transmit management packets to the network. Some examples of the NIC 212 include Intel 82541 and 82571 NIC. In FIG. 2, the connection and function of the iKVM controller 220 and the NIC 222 for the iKVM are the same as those of the corresponding components in the configuration of FIG. 1. Each NIC 212, 222 is connected to a network connector, and two network connectors and two network cables are required for this configuration. Although in FIG. 2 the NIC 232 for BMC is shown as a separate component, the NIC 232 may be omitted, or it may be in the same chip as the BMC 230.

Similarly, certain commercially available NICs provide the ability to transmit iKVM data (e.g., keyboard, video and mouse data) via the management channel of the NIC. Using such a NIC allows the iKVM controller to share the network connection of the system. In a server 300 adopting such a configuration, schematically illustrated in FIG. 3, the NIC 312 for the system has a management channel capable of handling the iKVM data. The NIC 322 for the iKVM controller 320 is connected to the management port of the NIC 312 for the system via a sideband connection 314, rather than connected to the network directly. Different IP addresses or MAC addresses can be used to separate different network traffic. The NIC 312 for the system detects incoming packets from the network; if the incoming packets have IP addresses or MAC addresses for the iKVM controller 320, they are delivered to the NIC 322 which transmits them to the iKVM controller 320. If the incoming packets have IP addresses or MAC addresses for the system section, they are sent to the system section 310. The iKVM controller 320 uses the NIC 312 for the system to transmit iKVM packets the network. In FIG. 3, the connection and function of the BMC 330 and the NIC 332 for the BMC are the same as those of the corresponding components in the configuration of FIG. 1. Each NIC 312, 332 is connected to a network connector, and two network connectors and two network cables are required. Although in FIG. 3 the NIC 322 for iKVM is shown as a separate component, the NIC 322 may be omitted, or it may be in the same chip as the iKVM 320.

In the configurations shown in FIGS. 2 and 3, the management channels (sidebands) in the NICs 212 and 312 are different due to the different requirements for transmitting iKVM data and IPMI messages. The iKVM traffic is typically heavier than the IPMI traffic and needs a sideband bus with a higher capacity. Due to these differences, it is difficult for both the iKVM controller and the BMC to share the same NIC for the system. Because sidebands for iKVM and BMC have different types, these two kinds of traffics could not be merged together.

SUMMARY OF THE INVENTION

The present invention is directed to a server with iKVM and server management functions where multiple sections of the server can share a network connection.

An object of the present invention is to allow a server with iKVM and server management functions to use a reduced number of network connections.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention provides a data processing device adapted for communicating with one or more remote consoles over a network, which includes: a first controller for processing first incoming network packets containing user input device signals originated from a first remote console and for generating first outgoing network packets containing user input device signals for the first remote console; a second controller for performing system monitoring functions, receiving second incoming network packets originated from a second remote console and generating second outgoing network packets for the second remote console, the second incoming and outgoing network packets containing management messages, the second controller being connected to the first controller; and a first network interface controller (NIC) connected to the first controller, wherein the first controller receives the first and second incoming network packets from the first NIC and transmits the second incoming network packets to the second controller, and wherein the first controller receive the second outgoing network packets from the second controller and transmits them to the first NIC.

In another aspect, the present invention provides a control device for controlling communicating with a remote console via a network interface controller (NIC), which includes: a first channel controller for communicating with the NIC, the first channel controller receiving from the NIC incoming network packets including first incoming network packets containing user input device signals originated from the remote console and second incoming network packets containing management interface messages; a second channel controller for communicating with an external controller; a processor for processing the first incoming network packets; and a filter circuit connected to the first channel controller for filtering the incoming network packets received from the NIC, the filter circuit transmitting the first incoming network packets to the processor and transmitting the second incoming network packets to the second channel controller for further delivery to the external controller, wherein the processor transmits first outgoing network packets to the first channel controller for further transmission to the NIC, the first outgoing network packets containing user input device signals for the remote console, and wherein the second channel controller transmits second outgoing network packets to the first channel controller for further transmission to the NIC, the second outgoing network packets containing management messages.

In yet another aspect, the present invention provides a method implemented in a data processing device, the data processing device including a first controller, a second controller connected to the first controller, and a first network interface controller (NIC) connected to the first controller, the data processing device being adapted for communicating with a remote console over a network, the method including: the first controller receiving first incoming network packets and second incoming network packets from the first NIC, the first incoming network packets containing user input device signals originated from the remote console, the second incoming network packets containing management messages; the first controller processing the first incoming network packets and generating first outgoing network packets containing user input device signals for the remote console; the first controller transmitting the second incoming network packets to the second controller; the second controller performing system monitoring functions and generating second outgoing network packets containing management messages; the second controller transmitting the second outgoing network packets to the first controller; and the first controller transmitting the first and second outgoing network packets to the first NIC.

It is to be understood that both the foregoing general description and the following detailed description are exemplary and explanatory and are intended to provide further explanation of the invention as claimed.

DETAILED DESCRIPTION OF THE PREFERRED EMBODIMENTS

As required, a detailed illustrative embodiment of the present invention is disclosed herein. However, techniques, systems and operating structures in accordance with the present invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the present invention. The following presents a detailed description of the preferred embodiment (as well as some alternative embodiments) of the present invention.

Figure 4:
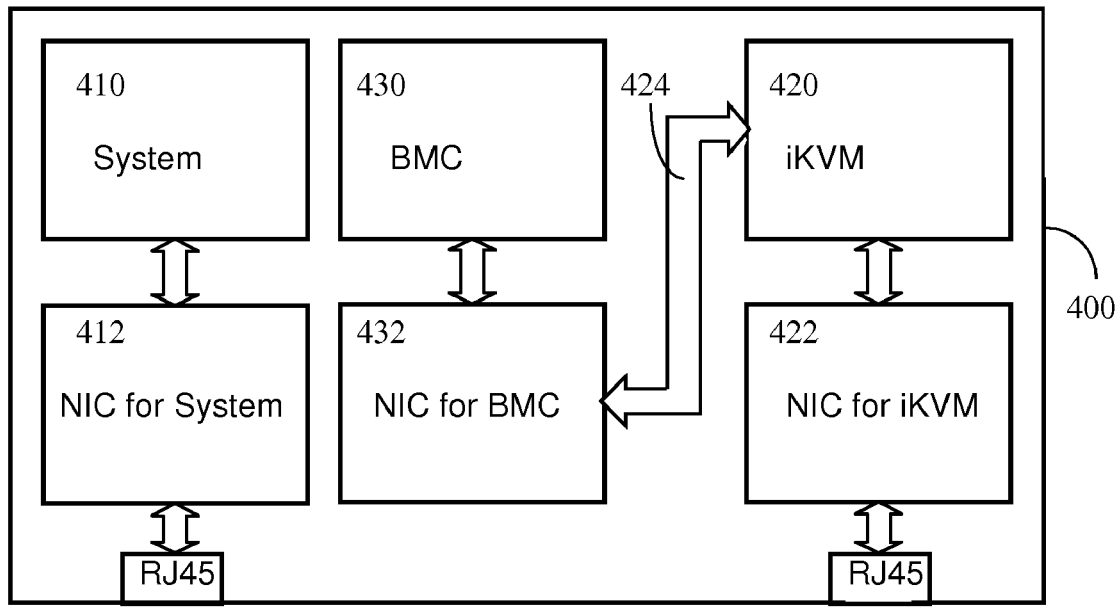
FIG. 4 schematically illustrates a server according to an embodiment of the present invention which has a system section, an iKVM section and an IPMI section, where the iKVM controller allows the IPMI and the iKVM sections to share a network connection.
Figure 6:
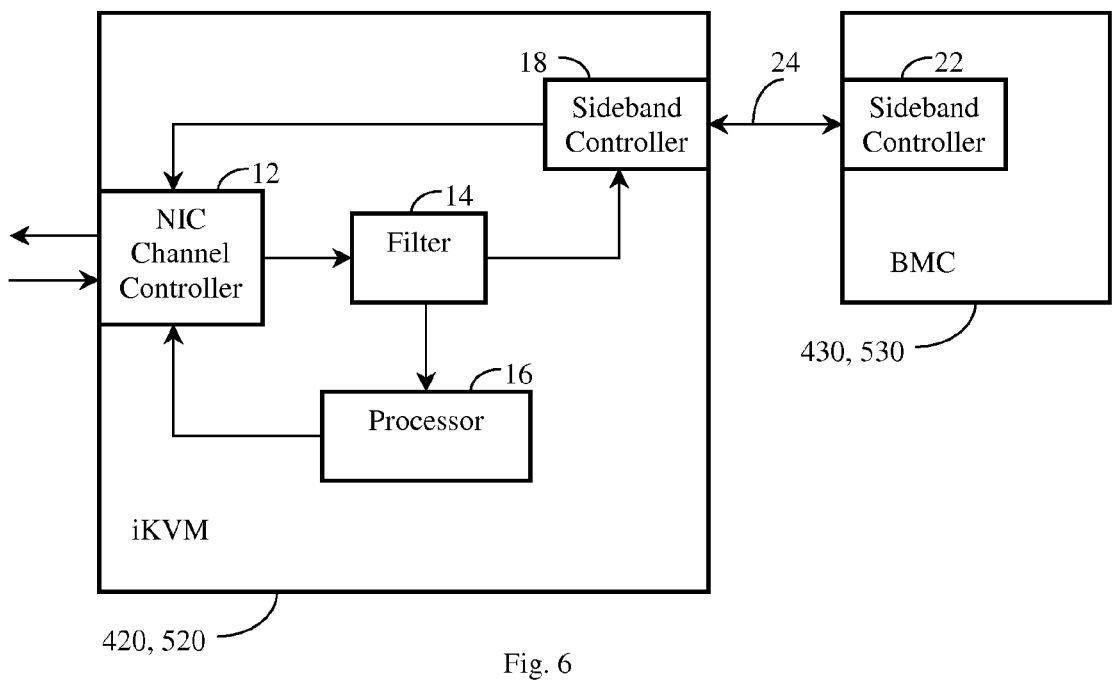
FIG. 6 schematically illustrates the iKVM controller of FIGS. 4 and 5 according to an embodiment of the present invention.

FIG. 4 schematically illustrates a server (or KVM switch) 400 with iKVM and server management such as IPMI functions according to an embodiment of the present invention. The server 400 includes a system section 410 including a CPU, memory, etc. for performing various functions of a server and/or other desired functions, a BMC 430 for handling server management functions, and an iKVM controller 420 for handling functions related to network-based remote access to the server. A NIC 412 for the system provides a network interface for the system section 410, and a NIC 422 provides a network interface for the iKVM controller 420. The NIC 412 for the system and the NIC 422 for the iKVM controller are each connected to a network connector, such as an RJ45 connector. The NIC 432 for the BMC is connected to the iKVM controller 420 via a sideband connection 424, rather than connected to the network directly. In an alternative embodiment, the NIC 432 for the BMC is replaced by firmware installed in the BMC 430, so that the BMC 430 is connected to the iKVM controller 420 via the sideband connection directly. The iKVM controller 420 is design to provide a communication channel similar to a management channel for the management packets. The structure of the iKVM controller 420 is shown in FIG. 6. Note that FIG. 6 corresponds to the alternative embodiment where the NIC 432 for the BMC is replaced by firmware in the BMC 430, and the iKVM controller 420 and the BMC 430 are connected by a sideband 24.

As shown in FIG. 6, relevant portions of the iKVM controller 420 includes a NIC channel controller 12 for controlling communication with the NIC 422, a sideband (management channel) controller 18 for controlling communication with the BMC 430, a filter circuit 14 for filtering incoming packets received from the NIC 422, and a processor 16 for performing iKVM functions. The incoming packets received from the NIC 422 via the NIC channel controller 12 are filtered by the filter circuit 14, which directs iKVM packets (packets that contain user input device signals from the remote console) to the process 16, and directs management packets (e.g. packets that contain IPMI messages) to the sideband interface 18. The filter circuit 14 distinguishes the iKVM packets and the management packets based on their different formats. In this disclosure, "user input device signals" refer to signals generated by the user input devices of the remote console for controlling a computer and signals generated by the iKVM controller for display or play by the remote console, including keyboard signals, pointer device signals, video signals, audio signals, and/or other signals as appropriate. User input device signals may have any suitable format, which may be defined by the manufacturer of the iKVM controller. The management packets may also have any suitable format. While the preferred embodiment of the present invention is intended to be used with an IPMI system that uses management packets conforming to the current IPMI standard, any other suitable formats may be used, including proprietary formats or formats confirming to standards that may come into existence in the future.

The functions of the processor 16 include processing incoming iKVM packets originated from the remote console and transmitted to the processor 16 by the filter circuit 14, and transmitting outgoing iKVM packets (e.g. packets containing video signals, audio signals and/or other signals) via the NIC channel controller 12 to the NIC 422 for further transmission to the network. The sideband controller 18 transmits the management packets from the filter circuit 14 to the BMC 430 via another sideband controller 22 on the BMC 430. Outgoing management packets generated by the BMC 430 are received by the sideband controller 18, transmitted via the NIC channel controller 12 to the NIC 422, and further transmitted over to the network to the remote IPMI management console.

Figure 1:
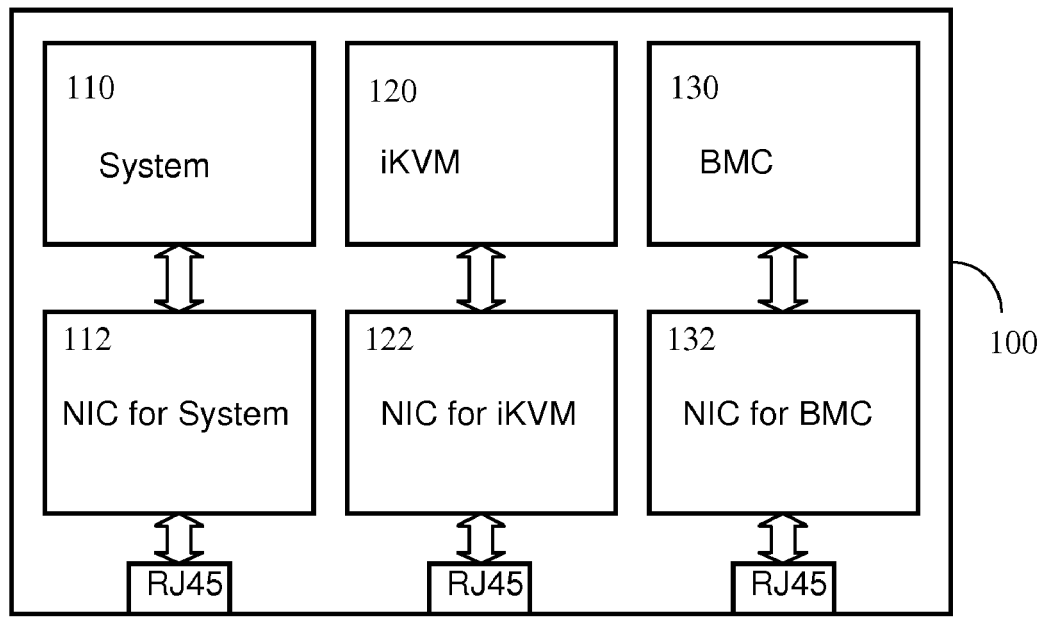
FIG. 1 schematically illustrates a server having a system section, an iKVM section and an IPMI section using three network connections.
Figure 2:
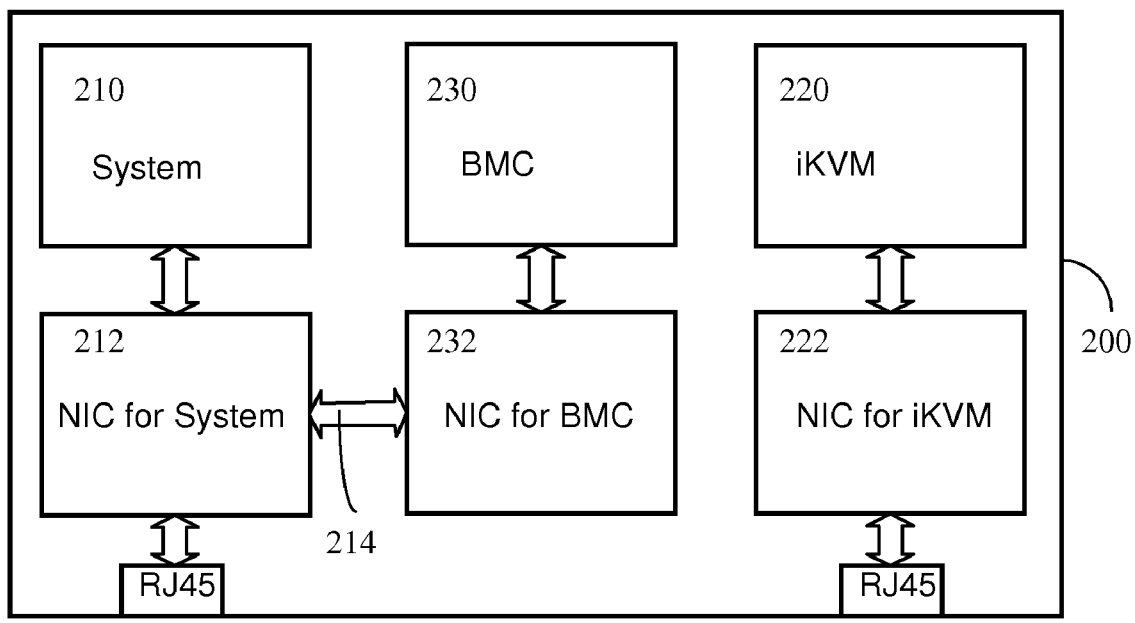
FIG. 2 schematically illustrates a server having a system section, an iKVM section and an IPMI section where the IPMI and system sections share a network connection.
Figure 3:
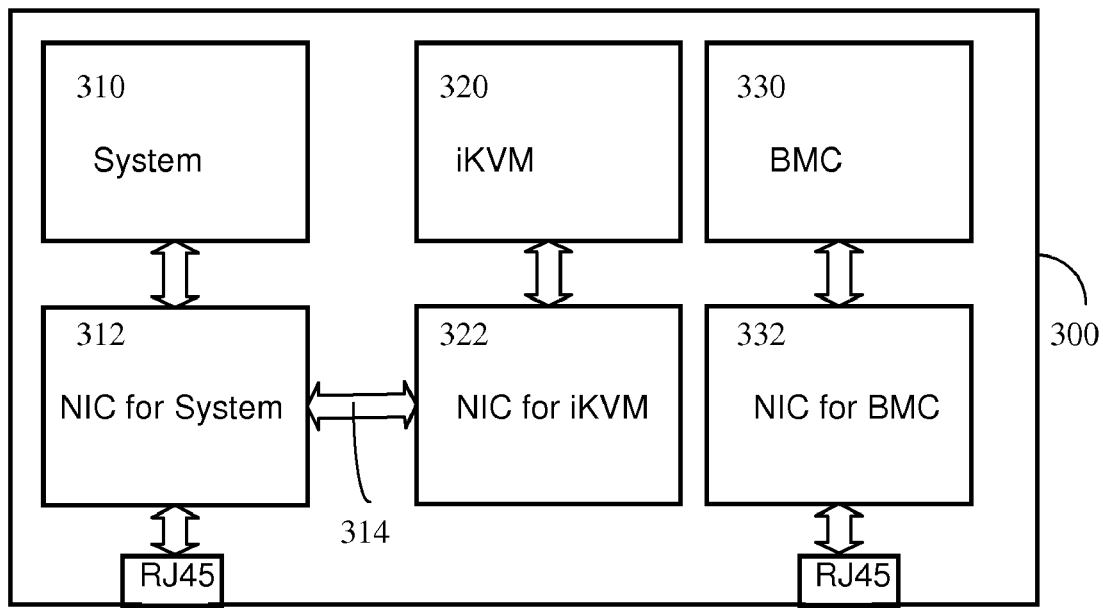
FIG. 3 schematically illustrates a server having a system section, an iKVM section and an IPMI section where the iKVM and system sections share a network connection.

Thus, by using the iKVM controller 420 that has a management channel function, the BMC 430 can share the network connection with the iKVM controller 420. In the configuration of FIG. 4, the connection and function of the system section 410 and the NIC 412 for the system are the same as those of the corresponding components in the configuration of FIG. 1. Two network connectors and two network cables are required.

Figure 5:
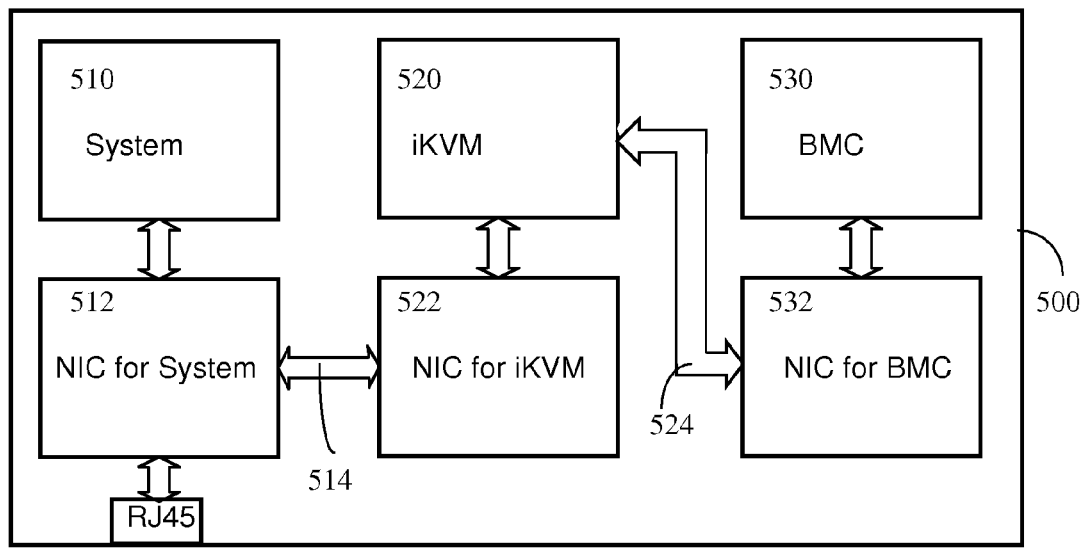
FIG. 5 schematically illustrates a server according to another embodiment of the present invention which has a system section, an iKVM section and an IPMI section, where the iKVM controller allows the system, the IPMI and the iKVM sections to share a network connection.

FIG. 5 schematically illustrates a server (or KVM switch) 500 with iKVM and server management functions according to another embodiment of the present invention. The server 500 includes a system section 510 including a CPU, memory, etc. for performing various functions of a server and/or other desired functions, a BMC 530 for handling server management functions, and an iKVM controller 520 for handling the functions related to network-based access to the server. A NIC 512 for the system, which provides a network interface for the system section 510, has a management channel in addition to the main channel, where the management channel is capable of handling the iKVM data. The NIC 522 for the iKVM controller is connected to the management port of the NIC 512 for the system via a sideband connection 514, rather than connected to the network directly. In an alternative embodiment, the NIC 522 for the iKVM controller is replaced by firmware installed in the iKVM controller 520, so that the iKVM controller 520 is connected to the NIC 512 for the system via the sideband connection directly. The NIC 532 for the BMC is connected to the iKVM controller 520 via a sideband connection 524, rather than connected to the network directly. In an alternative embodiment, the NIC 532 for the BMC is replaced by the firmware installed in the BMC 530, so that the BMC 530 is connected to the iKVM controller 520 via the sideband connection directly. The iKVM controller 520 is design to provide a communication channel similar to a management channel. The structure of the iKVM controller 520 is shown in FIG. 6 and described earlier (Note that FIG. 6 corresponds to the alternative embodiment where the NIC 532 for the BMC is replaced by firmware in the BMC 530, and the iKVM controller 520 and the BMC 530 are connected by a sideband 24); the communication between the iKVM 520 and the BMC 530 is the same as described earlier.

The NIC 512 for the system is capable of detecting incoming packets from the network and distinguishing iKVM packets and management packets from packets intended for the system. The management packets (such as IPMI format packets) are distinguished from other packets based on their format, and iKVM packets are distinguished from packets for the system based on their IP addresses or MAC addresses. The iKVM packets and management packets are transmitted to the NIC 522 for the iKVM, and other packets are sent to the system section 510.

In the server 100-500, the server management function and iKVM function are functionally separate. The remote management console that communicate with and manages the server management functions and the remote console that communicates and manages server via the iKVM controller can be different consoles, or they can be the same console.

Although embodiments of the present invention are described above as applying to a server or a KVM switch having iKVM and server management functions, the invention can also be applied to other types of data processing devices.

It will be apparent to those skilled in the art that various modification and variations can be made in the server or iKVM switch of the present invention without departing from the spirit or scope of the invention. Thus, it is intended that the present invention cover modifications and variations that come within the scope of the appended claims and their equivalents.

What is claimed is:

1. A data processing device adapted for communicating with one or more remote consoles over a network, comprising:
   a first controller for processing first incoming network packets containing user input device signals originated from a first remote console and for generating first outgoing network packets containing user input device signals for the first remote console;
   a second controller for performing system monitoring functions, receiving second incoming network packets originated from a second remote console and generating second outgoing network packets for the second remote console, the second incoming and outgoing network packets containing management messages, the second controller being connected to the first controller;
   a network connector for connecting to the network; and
   a first network interface controller (NIC) connected between the network connector and the first controller such that the first and second controller share the same network connector, wherein the first controller receives the first and second incoming network packets from the first NIC and transmits the second incoming network packets to the second controller, and wherein the first controller receive the second outgoing network packets from the second controller and transmits them to the first NIC;
   wherein the first controller is connected to the second controller via a sideband.

2. The device of claim 1, wherein the first controller includes:
   a processor for processing the first incoming network packets;
   a first channel controller connected to and communicating with the first NIC;
   a second channel controller connected to and communicating with the second controller; and
   a filter circuit connected to the first channel controller for filtering incoming network packets received from the first NIC, the incoming network packets including the first incoming network packets and the second incoming network packets, the filter circuit transmitting the first incoming network packets to the processor and transmitting the second incoming network packets to the second channel controller,
   wherein the processor transmits the first outgoing network packets via the first channel controller to the first NIC, and the second channel controller transmits the second outgoing network packets via the first channel controller to the first NIC.

3. The data processing device of claim 1, wherein the first controller is network-based keyboard-video-mouse controller.

4. The data processing device of claim 1, wherein the second controller is a baseboard management controller.

5. The data processing device of claim 1, wherein the network connector is an RJ45 connector.

6. The data processing device of claim 1, further comprising:
   a system section;
   a second network connector for connecting to the network; and
   a second NIC connected between the second network connector and the system section;
   wherein the second NIC further receives third network packets via the second network connector and transmits them to the system section.

7. The data processing device of claim 6, wherein the first controller is connected to the second controller via a sideband.

8. The data processing device of claim 6, wherein the second network connector is an RJ45 connector.

9. A data processing device adapted for communicating with one or more remote consoles over a network, comprising:
   a first controller for processing first incoming network packets containing user input device signals originated from a first remote console and for generating first outgoing network packets containing user input device signals for the first remote console;
   a second controller for performing system monitoring functions, receiving second incoming network packets originated from a second remote console and generating second outgoing network packets for the second remote console, the second incoming and outgoing network packets containing management messages, the second controller being connected to the first controller;
   a network connector for connecting to the network;
   a first network interface controller (NIC) connected to between the network connector and the first controller such that the first and second controller share the same network connector, wherein the first controller receives the first and second incoming network packets from the first NIC and transmits the second incoming network packets to the second controller, and wherein the first controller receive the second outgoing network packets from the second controller and transmits them to the first NIC;
   a system section;
   a second NIC connected between the network connector and the first NIC, and also to the system section such that the system section and the first and second controller share the same network connector; and
   wherein the second NIC receives the first and second incoming network packets via the network connector and transmits them to the first NIC, and wherein the second NIC further receives third network packets via the network connector and transmits them to the system section.

10. The data processing device of claim 9, wherein the second NIC has a main channel and a second channel, and wherein the first NIC is connected to the second channel of the second NIC.

11. The data processing device of claim 9, wherein the first controller is connected to the second controller via a sideband.

12. A control device for controlling communicating with a remote console via a network interface controller (NIC), comprising:
  a first channel controller for communicating with the NIC, the first channel controller receiving from the NIC incoming network packets including first incoming network packets containing user input device signals originated from the remote console and second incoming network packets containing management messages;
  a second channel controller for communicating with an external controller;
  a processor for processing the first incoming network packets; and
  a filter circuit connected to the first channel controller for filtering the incoming network packets received from the NIC, the filter circuit transmitting the first incoming network packets to the processor and transmitting the second incoming network packets to the second channel controller for further delivery to the external controller,
  wherein the processor transmits first outgoing network packets to the first channel controller for further transmission to the NIC, the first outgoing network packets containing user input device signals for the remote console, and
  wherein the second channel controller transmits second outgoing network packets to the first channel controller for further transmission to the NIC, the second outgoing network packets containing management messages;
  wherein the second channel controller is connected to the external controller via a sideband.

13. The control device of claim 12, wherein the controller is network-based keyboard-video-mouse controller.

14. The control device of claim 12, wherein the external controller is a baseboard management controller.

* * * * *